(12) United States Patent
Söderholm et al.

(10) Patent No.: US 6,185,983 B1
(45) Date of Patent: *Feb. 13, 2001

(54) METHOD AND APPARATUS FOR AUTOMATICALLY DETERMINING ZERO SETTING OF IMPELLER-TYPE MASS FLOW RATE-MEASURING DEVICE WHEN FLOW IS ABSENT

(75) Inventors: Arne Söderholm; Olle Söderholm, both of Bromma (SE)

(73) Assignee: S.E.G. Mekanik AB, Amal (SE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/024,961

(22) Filed: Feb. 11, 1998

(30) Foreign Application Priority Data

Feb. 11, 1997 (SE) .................................................. 97850019

(51) Int. Cl.⁷ ...................................................... G01F 25/00
(52) U.S. Cl. ............................................................ 73/1.34
(58) Field of Search ................................ 73/1.16, 1.34, 73/1.27, 1.28, 861.354, 861.351

(56) References Cited

U.S. PATENT DOCUMENTS

| | | | |
|---|---|---|---|
| 4,546,770 | * 10/1985 | Schlessinger et al. | 128/630 |
| 5,191,802 | * 3/1993 | Fassbinder | 73/861.354 |
| 5,469,750 | * 11/1995 | Lloyd et al. | 73/1.34 |
| 5,542,286 | * 8/1996 | Wang et al. | 73/1.34 |

FOREIGN PATENT DOCUMENTS

| | | |
|---|---|---|
| 2 030 862 | 2/1972 | (DE) . |
| WO 92/08958 | 5/1992 | (WO) . |

OTHER PUBLICATIONS

Kranse et al, Linearlisation of a urinary flow transducer; Medical & Biological Engineering & Computing, Nov. 1995, vol. 33, No. 6, pp. 835–837.

Patent Abstracts of Japan, vol. 096, No. 004, Apr. 30, 1996 & JP 07 333017 A.

* cited by examiner

Primary Examiner—Robert Raevis
(74) Attorney, Agent, or Firm—Pillsbury Madison & Sutro LLP

(57) ABSTRACT

A method for zero setting of a measuring device in which particles to be measured are subjected to tangential acceleration in a whirling impeller and torque exerted on the vanes of the impeller in reaction to the Coriolis force of acceleration of the particles is being measured as an indication of mass flow rate. The flow of material is fed to a central part of the impeller and by centrifugal force is thrown outwardly of the impeller. The flow is measured by an electronic device including a microcomputer. When the flow is absent, such condition being continually sensed for, the mean value of the torque during a chosen time or a number of revolutions of the impeller is automatically determined and memorized. This memorized torque value is used as a tare value until a next time a new tare value can be memorized.

1 Claim, 1 Drawing Sheet

METHOD AND APPARATUS FOR AUTOMATICALLY DETERMINING ZERO SETTING OF IMPELLER-TYPE MASS FLOW RATE-MEASURING DEVICE WHEN FLOW IS ABSENT

BACKGROUND OF THE INVENTION

The present invention relates to an apparatus for measuring a mass flow, in particular bulk material or a fluid, and the invention especially relates to a zero setting arrangement used in a measuring device in which the mass flow rate is measured by using the Coriolis measuring principle. The arrangement according to the invention concerns both a method for zero setting and a device for implementing the method.

Such a prior measuring device is known from our copending European patent application No. 96850202.1, filed on Nov. 29, 1996, describing the main principles for such a mass flow meter, and to which application the interested reader is referred.

In such a measuring device, the particles to be measured are subjected to tangential acceleration in a whirling impeller, and the torque exerted on the vanes of the impeller in reaction to the Coriolis force of accelerated particles is measured as an indication of the mass flow rate. The object of our above European patent application was to avoid measurement errors, due to uneven distribution of the material to be measured.

Even though the accuracy in the measurements has been greatly improved by our previous device, it is still necessary to adjust the device for eliminating or reducing measurement errors due to variations in bearing friction in the bearings supporting the impeller shaft.

SUMMARY OF THE INVENTION

The object of the present invention is therefore to provide a method and a device for the zero setting of a measuring device according to our previous application.

According to the invention, when the flow of material into the impeller is temporarily interrupted, by being naturally interrupted or mechanically interrupted, during the interruption period the torque on the drive motor for the impeller is measured, and the mean value of the torque is used as the zero mass flow value. The invention also provides for a device for the zero setting, and the device therefore includes a controllable valve.

BRIEF DESCRIPTION OF THE DRAWING

The invention will now be described in the form of a non-limiting embodiment, shown in the attached drawings, in which.

DETAILED DESCRIPTION

Figure 1:
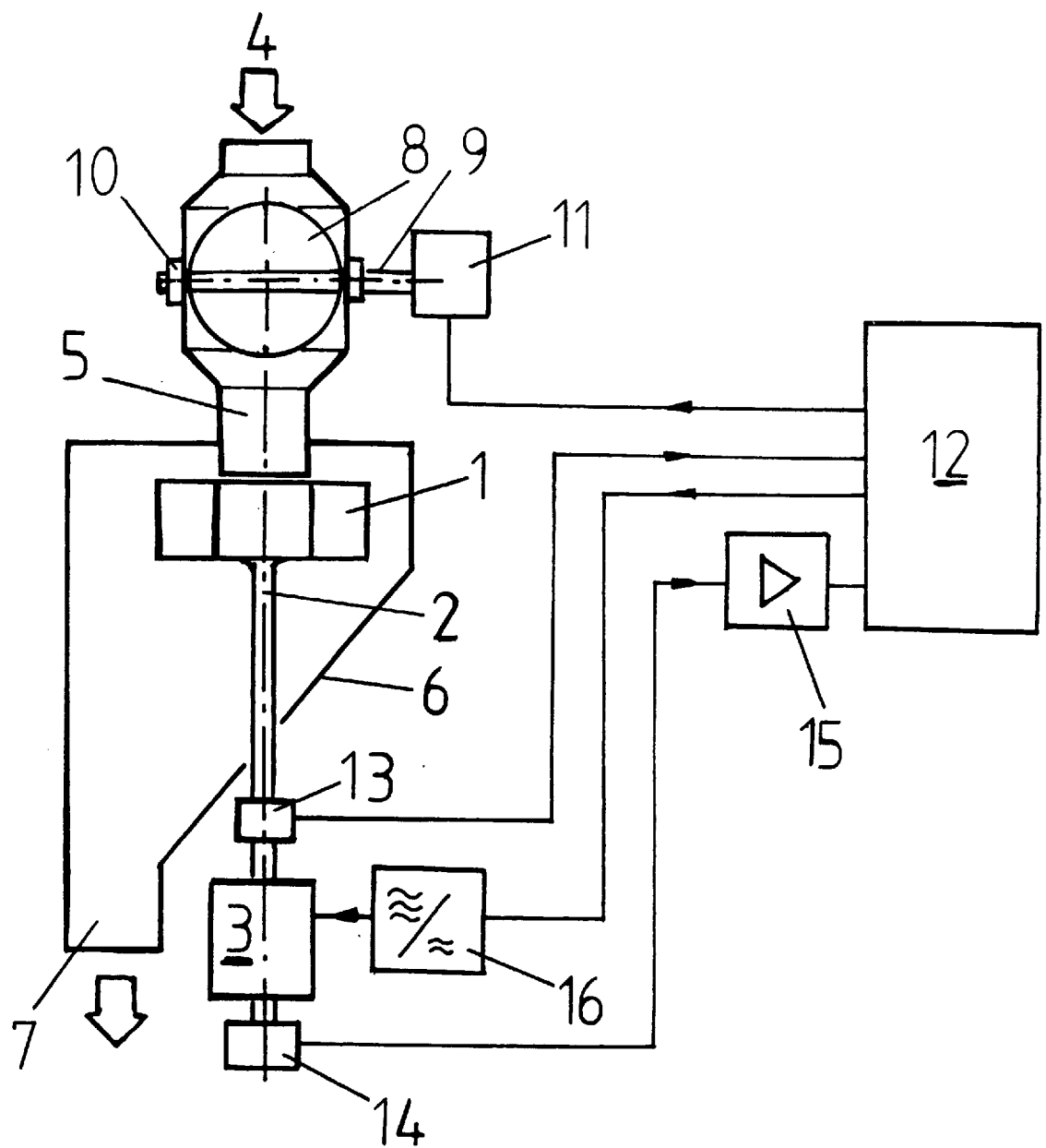
FIG. 1 shows a schematic block diagram of a zero setting device according to the invention.

In FIG. 1 is shown an impeller 1 intended to be a part of a complete device for measuring a mass flow of the kind described in our copending European patent application No. 96850202.1. The other parts relating to the measuring device can have the same, but also alternative, designs as those shown in our previous application. The impeller 1 is mounted for rotation around a vertical rotatable shaft 2, driven by an electric motor 3. The material 4 to be measured is fed to the impeller 1 via an inlet device, ending with an inlet tube 5 closest to the impeller 1, the tube 5 reaching into a housing 6 enclosing the impeller 1. The housing 6 can, as shown be formed as a hopper, at the bottom ending with an outlet opening 7 for the material which has been measured.

The inlet device shown comprises a controllable flap valve 8, or another type of quickly movable valve, which can stop the flow of material into the inlet tube 5 and the impeller 1. The flap valve 8 is rotatable by means of a shaft 9, journalled in bearings 10 and its rotation is controlled by a turning device 11. The turning device 11 is, in turn, controlled by a control device 12, e.g. a measuring and controlling computer. The turning device can be an electric or hydraulic-operated turning device.

To the vertical rotatable shaft 2 a tachometer 13 is attached, for registering the rotation speed of the shaft 2, and transmitting the information to the control device 12. The torque on the electric motor 3 is monitored by a torque, measuring device 14, connected to a signal processor 15, in which the output signal from the torque, measuring device 14 is converted to an input signal to the control device 12, for transmitting a torque input signal to the control device 12. Further, a static frequency changer 16 is connected between the control device 12 and the electric motor 3, so that the control device 12 can control also the speed of the electric motor 3.

When no material then enters the impeller 1, the torque on the electric motor 3 is measured by the torque measuring device 14, and the signal from this torque measuring device 14 is via the signal processor 15 transmitted to the control device 12 in which the mean value of the torque during a chosen time or during a number of revolutions is decided. The mean value is memorized in the control device 12, and is thereafter considered as the zero torque value, the tare value, when no material is fed through the impeller 1.

For the zero setting of the measuring device the flow of material in the inlet device is sensed by the control device, 12, and the mean value of the torque can then be calculated and memorized when the flow is absent. Alternatively, the material in the inlet device can by the rotatable valve 8 be automatically stopped when the rotatable valve 8 is rotated to its closed position by means of the shaft 9, and the turning device 11 can be controlled by the control device 12. The zero setting in the later form can preferably be made at regular intervals. It also is done at regular intervals and when the flow of material simultaneously is absent.

In arrangements where the rotational speed of the rotatable shaft 2 can be varied, a zero setting of the above-described type is made and memorized for a number of chosen discrete rotational speeds, which are regulated by the control device 12.

During variation of the rotational speed, the influence of change in the moment of inertia of the impeller on the indication of material totalization and flow may also be compensated for.

What is claimed is:

1. A method for determining at least one zero setting for a mass flow measuring device in which, during mass flow measurement, a flow of particles along a path, the mass flow rate of which flow is to be measured, is subjected to tangential acceleration by a whirling impeller imposed in said path, and torque exerted on vanes of the impeller in reaction to the Coriolis force due to acceleration of the particles, as the flow is directed at a central part of the impeller and is by centrifugal force thrown outwardly of the impeller, is measured by an electronic control device as an indication of the mass flow rate of the particles, said method comprising:

(a) said electronic control automatically continuously sensing for absence of said flow by analyzing a flow-dependent signal pattern;

(b) upon determining as a result of said sensing that said flow is absent, said electronic control device calculating a mean value for torque exerted on said vanes of said impeller during one of a predetermined interval of time and a predetermined number of revolutions of said impeller, (c) saving said mean value in a memory as a memorized zero setting of torque;

(d) using said memorized mean value by said measuring device for mass flow rate measurement of said flow of particles, at a respective rotational speed of said impeller, until again conducting steps (b) and (c), as a result of continuing to conduct step (a); and (e) conducting steps (a)–(d) for each of a plurality of different rotational speeds of said impeller.

* * * * *

UNITED STATES PATENT AND TRADEMARK OFFICE
CERTIFICATE OF CORRECTION

PATENT NO. : 6,185,983 B1
DATED : February 13, 2001
INVENTOR(S) : Arne Soderholm It is certified that error appears in the above-identified patent and that said Letters Patent is hereby corrected as shown below:

Title page,
Item [30], Foreign Application Priority Data should read as follows:

Feb. 11, 1997   (EP)   97850019.7

Signed and Sealed this

Twentieth Day of November, 2001

Attest:

NICHOLAS P. GODICI
Attesting Officer    Acting Director of the United States Patent and Trademark Office